(12) United States Patent
Cavallaro et al.

(10) Patent No.: US 6,657,584 B2
(45) Date of Patent: Dec. 2, 2003

(54) LOCATING AN OBJECT USING GPS WITH ADDITIONAL DATA

(75) Inventors: Richard H. Cavallaro, Mountain View, CA (US); Stanley K. Honey, Palo Alto, CA (US); Kenneth A. Milnes, Fremont, CA (US); Marvin S. White, San Carlos, CA (US)

(73) Assignee: Sportvision, Inc., New York, NY (US)

( * ) Notice: Subject to any disclaimer, the term of this patent is extended or adjusted under 35 U.S.C. 154(b) by 0 days.

(21) Appl. No.: 09/888,217

(22) Filed: Jun. 22, 2001

(65) Prior Publication Data

US 2002/0030625 A1 Mar. 14, 2002

Related U.S. Application Data

(60) Provisional application No. 60/213,684, filed on Jun. 23, 2000.

(51) Int. Cl.[7] ............................................... H04B 7/185
(52) U.S. Cl. ........................ 342/357.06; 342/357.01; 342/357.07
(58) Field of Search .................. 342/357.01, 357.06, 342/357.07, 457; 701/213, 215

(56) References Cited

U.S. PATENT DOCUMENTS

| | | |
|---|---|---|
| 5,442,558 A | 8/1995 | Kyrtsos et al. |
| 5,452,211 A | 9/1995 | Kyrtsos et al. |
| 5,490,073 A | 2/1996 | Kyrtsos |
| 5,815,114 A | 9/1998 | Speasl et al. |
| 5,948,043 A | 9/1999 | Mathis |
| 5,952,958 A | 9/1999 | Speasl et al. |
| 5,959,575 A | 9/1999 | Abbott |
| 5,977,909 A | 11/1999 | Harrison et al. |
| 5,982,324 A * | 11/1999 | Watters et al. ......... 342/357.06 |
| 5,999,878 A | 12/1999 | Hanson et al. |
| 6,100,806 A | 8/2000 | Gaukel |
| 6,104,340 A | 8/2000 | Krasner |
| 6,133,874 A | 10/2000 | Krasner |
| 6,272,430 B1 | 8/2001 | Krasner |
| 6,275,185 B1 | 8/2001 | Loomis |

* cited by examiner

*Primary Examiner*—Dao Phan
(74) *Attorney, Agent, or Firm*—Vierra Magen Marcus; Harmon & DeNiro LLP

(57) ABSTRACT

A system is disclosed that uses GPS and additional data to determine the location of an object. Typically, GPS receivers need valid data from four satellites to accurately determine a three dimensional location. If a GPS receiver is receiving valid data from fewer than four satellites, then additional data is used to compensate for the shortage of satellites in view of the GPS receiver. Examples of additional data includes a representation of the surface that the object is traveling on, an accurate clock, an odometer, dead reckoning information, pseudolite information, and error correction information from a differential reference receiver. An exemplar use of the disclosed system is to concurrently track a set of one or more automobiles during a race. The determined locations of the automobile can be used to provide route information, to generate statistics and/or to edit video of one or more of the automobiles.

46 Claims, 6 Drawing Sheets

LOCATING AN OBJECT USING GPS WITH ADDITIONAL DATA

This application claims the benefit of U.S. Provisional Application No. 60/213,684, "Locating an Object Using GPS With Additional Data," filed on Jun. 23, 2000, incorporated herein by reference.

BACKGROUND OF THE INVENTION

1. Field of the Invention

The present invention is directed to a system for determining the position of an object.

2. Description of the Related Art

Technologies for tracking moving objects are in demand. For example, systems are used to track airplanes, automobiles, persons, objects at sporting events and other objects of interest. Examples of tracking objects at sporting events include systems for tracking hockey pucks during a hockey game using infrared technology, tracking objects using RF signals and tracking objects using pattern recognition technology.

One technology that has become popular for tracking objects is the use of the Global Positioning System (GPS). GPS is a satellite based navigation system operated and maintained by the U.S. Department of Defense. GPS consists of a constellation of 24 GPS satellites providing worldwide, 24 hour, three dimensional navigational services. By computing the distance to GPS satellites orbiting the earth, a GPS receiver can calculate an accurate position of itself. This process is called satellite ranging. The position being tracked is the position of the antenna of the GPS receiver. In one implementation, a GPS receiver receives signals from a set of satellites, determines its location and outputs a derived position (longitude and latitude), GPS derived velocity, Dilution of precision (DOP) and a list of the members of the satellite constellation. The satellite constellation includes a list of satellites for which the GPS receiver has received data. Experimentation has shown that GPS data is more reliable when the GPS receiver is receiving data from the same satellites for an extended period of time. When the satellite constellation changes, the GPS data tends to be less reliable.

The basis of satellite ranging is multi-lateration. A GPS receiver measures distance using the travel time (or differences in travel time) of radio signals. To measure travel time (or differences in travel time), GPS receivers need very accurate timing. Along with distance, a GPS receiver needs to know exactly where the satellites are in space. Finally, the GPS receiver can correct for any delays the signal experiences as it travels through the atmosphere. A calculation of a three dimensional location requires valid data from four satellites. GPS receivers can also provide precise time information.

In general, satellite ranging can be thought of as follows. If the receiver knows the distance from the satellite to the receiver, then the receiver can symbolically draw a sphere with the center of the sphere at the satellite's location and the radius of the sphere equal to the distance from the satellite to the receiver. The receiver is somewhere on the surface of the sphere. If the receiver knows the distance from three satellites, the receiver draws three spheres. These three spheres will intersect at two points. The receiver is located at one of the two points. In many cases, it is possible to eliminate one of the points because one of the points is a ridiculous answer. For example, one of the points can be too far from earth. A fourth measurement is typically used to determine which of the two points is the true location of the receiver. The fourth measurement is also used for timing purposes, as described below.

A GPS receiver measures the distance from a satellite to the receiver by measuring the time it takes for a signal sent from the satellite to arrive at the receiver. Because the time of travel from the satellite to the receiver is extremely short, the receiver must have precise clock information. A GPS satellite emits a pseudo-random code. The receiver will also generate the same pseudo-random code and compare the generated code with the received code to determine the shift between the two codes. That shift is used to determine travel time. One key to the above computation is extremely accurate timing. Satellites have incredibly precise atomic clocks on board. However, it is not cost effective for the receivers to also have such atomic clocks. To compensate for not having an atomic clock, the receivers need data from an extra satellite (e.g. the fourth satellite) in order to determine time values.

As stated above, a GPS receiver must know the location of the satellite. The GPS satellites have been injected into very precise orbits. GPS receivers have an almanac programmed into their computers that tell them where in the sky each satellite is, moment by moment. Neverth 12,2000eless, a satellite can deviate from the perfect orbit due to such errors induced by gravitational pulls from the moon and sun, and by the pressure of solar radiation on the satellite. These errors are called ephemeris errors because they effect the satellites orbit or ephemeris. The Department of Defense measures satellites' exact position and relays that information back to the satellite itself. The satellite then includes this new position correction information in its transmitted signal.

There are a number of errors that are associated with GPS ranging, including errors due to the Earth's ionosphere and atmosphere. Additionally, basic geometry itself can magnify these errors. The configuration of the satellites in the sky can also magnify the errors. The dilution of precision, a measure of error, is a description of the uncertainty of particular GPS data.

One enhancement to standard GPS technology includes the techniques of differential GPS, which involves a reference GPS receiver that is stationary and other GPS receivers that are moving and making position measurements. To understand differential GPS, it is important to know that the satellites are so far out in space that the little distances traveled on Earth are insignificant in comparison. So, if two receivers are fairly close to each other, say within a few hundred kilometers, the signals that reach both of them will have traveled through virtually the same slice of atmosphere, and will have virtually the same errors. With differential GPS, one stationary reference receiver is used to measure the timing errors. The reference receiver then provides error correction information to the other receivers (e.g. mobile receivers). This way, systemic errors can be effectively eliminated from the system, even the Selective Availability errors. In order to work properly, the reference receiver is placed at a location that is accurately surveyed. The reference receiver receives the same GPS signals as the moving receivers. Thus, instead of working like a normal GPS receiver, it attacks the equations backwards. Instead of using timing signals to calculate its position, it uses its known position to calculate timing. It figures out what the travel time of the GPS signals should be, and compares it to what they actually are. The difference is the error correction factor or reference error information. The reference receiver then transmits this reference error information to the moving receivers in order to correct the measurement of the moving receivers. Since the reference receiver has no way of knowing which of the many available satellites a moving receiver might be using to calculate is position, the reference receiver quickly runs through all the visible satellites and computes each of their errors. Then it encodes this information in standard format and transmits it to the moving receivers. The information can be transmitted using RF or other technologies. The moving receivers get the complete list of errors and apply corrections to the particular satellites they are using.

It is possible for an individual entity to set up its own reference receiver. Alternatively, there are public agencies which already have reference receivers that transmit corrections which can be received for free. It is also possible, that the reference receiver can send its information to a central computer and the moving receivers can also send information to the central computer. The central computer uses the information from the moving receiver, taking into account the errors from the reference receiver, in order to determine receiver locations.

As described above, a GPS receiver needs valid data from four GPS satellites in order to determine a three dimensional location. Thus, if fewer than four satellites are available, a GPS receiver typically can not determine its location. However, there may be some applications where gaps in validly determined GPS derived locations can not be tolerated. For example, an air traffic control system can not afford to lose a fix on an airplane near an airport. In some prior art systems where gaps of GPS data can not be tolerated, prior art systems have overcome the loss of one of four satellites by using an extremely accurate clock with the GPS receiver. For example, using an atomic clock at a GPS receiver can eliminate a need for the fourth satellite and allow the GPS receiver to determine a three dimensional location based on data from three satellites. As discussed above, using an atomic clock in a GPS receiver can be very expensive and make the cost of the GPS receiver prohibitive.

If the system only expects to have fewer than four satellites for a small period of time, the system can utilize a high precision clock that can provide highly accurate time for very short time periods. For example, a high quality quartz oscillator can be used to provide extremely accurate time for 5–10 seconds. The quartz oscillator is constantly running and the GPS receiver is keeping track of the timing information from the satellites. When the timing information cannot be calculated from the satellites because fewer than four satellites are in view of the receiver, the GPS receiver can calculate time by adding time from the oscillator to the previously known timing information from the GPS satellites. However, because the quartz oscillator will drift overtime, data from the quartz oscillator can only be used for 5–10 seconds.

While using a quartz oscillator (or other high precision clock) can allow the system to continue to function for a very brief period of time while one of four satellites are not in view of the GPS receiver, the system is still not reliable enough for many applications. For example, if fewer than three satellites are available than the information from the quartz oscillator does not provide sufficient data to make up for the loss of satellite data. Additionally, if the length of time that the fourth satellite is not available to the GPS receiver is greater than the 5–10 second range of the quartz oscillator, then the quartz oscillator no longer provides additional information necessary to determine a three dimensional location. A quartz oscillator can be used for more than 10 seconds if less accuracy is needed.

Thus, there is a need for improved GPS technology that allows a system to determine a location when fewer than four satellites are available.

SUMMARY OF THE INVENTION

The present invention, roughly described, provides for a system that uses GPS and additional data to determine the location of an object. Typically, GPS receivers need valid data from four satellites to accurately determine a three dimensional location. If a GPS receiver is receiving valid data from fewer than four satellites, then additional data is used to correct for any errors or lack of precision due to the shortage of satellites in view of the GPS receiver. Examples of additional data include a representation of the surface that the object is traveling on, an accurate clock, an odometer, dead reckoning information, pseudolite information, error correction information from a differential GPS reference receiver, and a combination of the above. One proposed use of the above-described invention is to track a set of one or more automobiles. For example, the system can be used to track a number of automobiles during a race, generate statistics about the automobiles and edit video of the race.

One embodiment of the present invention includes the method of receiving GPS data, accessing a representation of a surface that the object is traveling on and using the representation of the surface with GPS data to determine the location of the object. In one embodiment, the representation of the surface is a two dimensional ribbon in three dimensional space, the surface is a road and the object is an automobile. The representation of the surface can be created by surveying the road and creating a mathematical model or representation of the road. GPS data can be received from a satellite, a pseudolite or a combination of both. Additional error information that can also be used by the system include receiving an error signal from a differential GPS reference receiver, using a high quality clock device such as a quartz oscillator, receiving odometer information, predicting path information about the object based on the odometer and/or the representation of the surface, and dead reckoning. In an autoracing embodiment, the system can also make use of the positions of vehicles in proximity to the one of interest and knowledge of how the driver navigated previous laps.

In one embodiment, the system typically will determine a three dimensional location of an object using valid data from at least four satellites. As the number of satellites is reduced, the system uses more additional data. For example, whenever the number of visible satellites decrease from four to three, the system can start using additional data about the representation of the surface. When the number of satellites reduces from three to two, the system can start using a high precision clock. When the number of satellites reduces from two to one, the system can start using a predicted path based on an odometer and/or the surface model. When the number of satellites reduces to zero, the system can use dead reckoning techniques.

The number of useful satellites and/or pseudolites visible is called the satellite count. A useful satellite is a satellite providing data with no more than a reasonable amount of errors so that the data can be used by the system. In one embodiment, the time for a GPS receiver to first acquire a fix on the object's location (cold start) can be significant as compared to the time it takes a GPS receiver to update the location. Thus, in those instances where the GPS receiver loses its ability to determine a three dimensional location because fewer than four satellites are available, then the time for the GPS receiver to recalculate a location after four satellites are in view (a cold start) can be made faster by providing to the GPS receiver the three dimensional location derived from the additional data.

In one embodiment, the present invention includes a GPS receiver located with the object, a processor, a storage device and at least one transmitter. The processor is in communication with the GPS receiver and is located with the object. The storage device is in communication with the processor and is located with the object. The transmitter is in communication with the processor and is located with the object. In one embodiment, the processor uses data from the GPS receiver to determine a three dimensional location of the object and sends that location to a central computer. The central computer can receive GPS derived locations from many different GPS receiver/processor pairs. The central computer can transform the three dimensional locations received into two dimensional positions in a video of the event. Based on these determined two dimensional positions in the video, the system can edit video to add one or more enhancements for purpose of increasing the enjoyment of the viewer.

In one alternative, the hardware at each of the objects does not determine the three-dimensional location of the object. Rather, the hardware located with each object collects data and sends the collected data to the central computer. The central computer also receives the additional data in order to determine the three dimensional location of the object. In another alternative, a web site can be maintained on the Internet which provides GPS derived locations, any of the data measured, and any enhanced video on a real time or delayed basis. A web site can also use the GPS derived locations and other data to allow a user to participate in a virtual race with real race cars. Furthermore, some of the error information used by the system can be transmitted to the central computer via the Internet.

The present invention can be accomplished using hardware, without any software. The present invention can also be implemented using a combination of both hardware and software. The software used for the present invention is stored on one or more processor readable storage media including hard disk drives, CD-ROMs, optical disks, floppy disks, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

Figure 1:
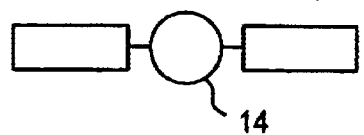
FIG. 1 is a block diagram of one embodiment of the system of the present invention.
Figure 1:
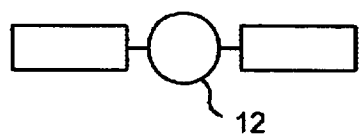
Figure 1:
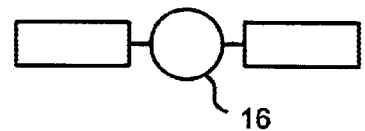
Figure 1:
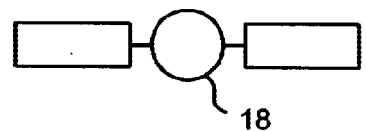
Figure 1:
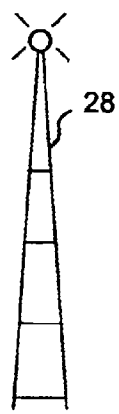
Figure 1:
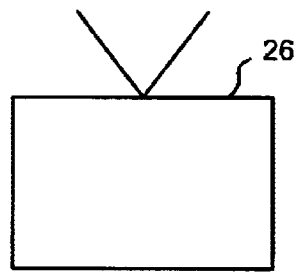
Figure 1:
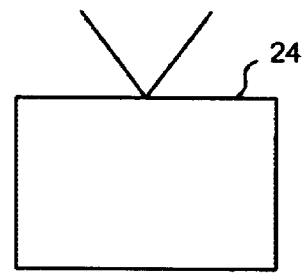
Figure 1:
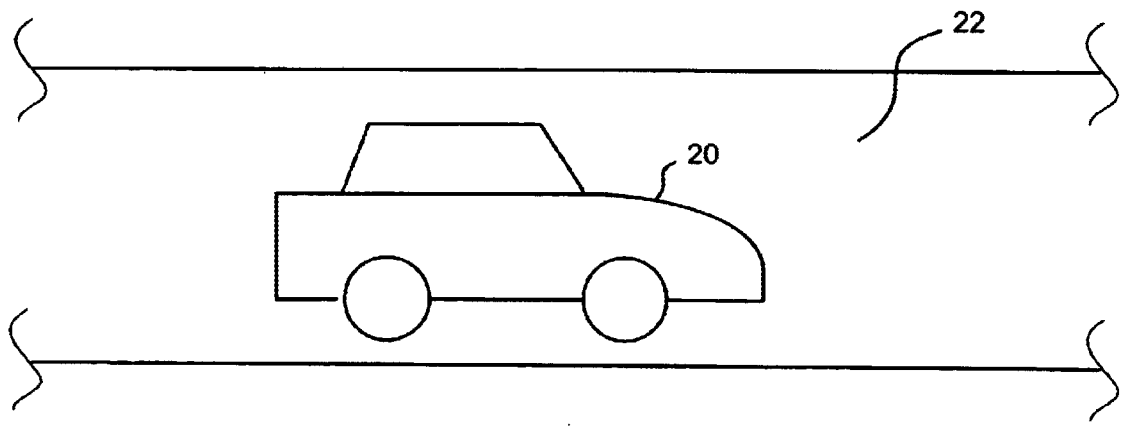

FIG. 1 is a block diagram of one embodiment of the present invention. The present invention for using GPS data to determine the location of an object can be applied to many different applications. For example purposes, an embodiment is discussed below for tracking automobiles during a race. Using the locations determined for each of the automobiles tracked, the system can generate statistics about the automobiles and edit video of the race in order to highlight one or more of the automobiles. The video of the race can also be edited to highlight other aspects of the race based on knowing the locations of one or more of the automobiles.

FIG. 1 shows four satellites 12, 14, 16 and 18. However, the GPS system includes 24 satellites. Thus, FIG. 1 could show up to 24 satellites. Additionally, the present invention provides a method for using data from fewer than four satellites. In one embodiment, a GPS receiver and other hardware are located in each automobile 20. Although FIG. 1 only shows one automobile, it is contemplated that the system includes GPS receivers in multiple automobiles. One embodiment of the present invention uses differential GPS. Thus, FIG. 1 shows differential GPS receiver and supporting electronics 24, which also receive information from the satellites. Information from each of the automobiles in the race is sent to a central computer location 26. In one embodiment, information is sent using RF. One implementation of the present invention also includes one or more pseudolites.

Pseudolites are transmitters whose signals have many of the characteristics of the signals broadcast by the satellites in the GPS system. In one embodiment, pseudolites are at a fixed location on or near the earth's surface. Thus, their exact position can be precisely known. Mobile pseudolites can also be used as long as their positions can be accurately determined. In one embodiment, the system includes pseudolite 28 which transmits a signal that can be used to help (like a satellite signal) determine a location of the objects. In other embodiments, multiple pseudolites can be used, including using four (or more) pseudolites and no satellites.

Figure 2:
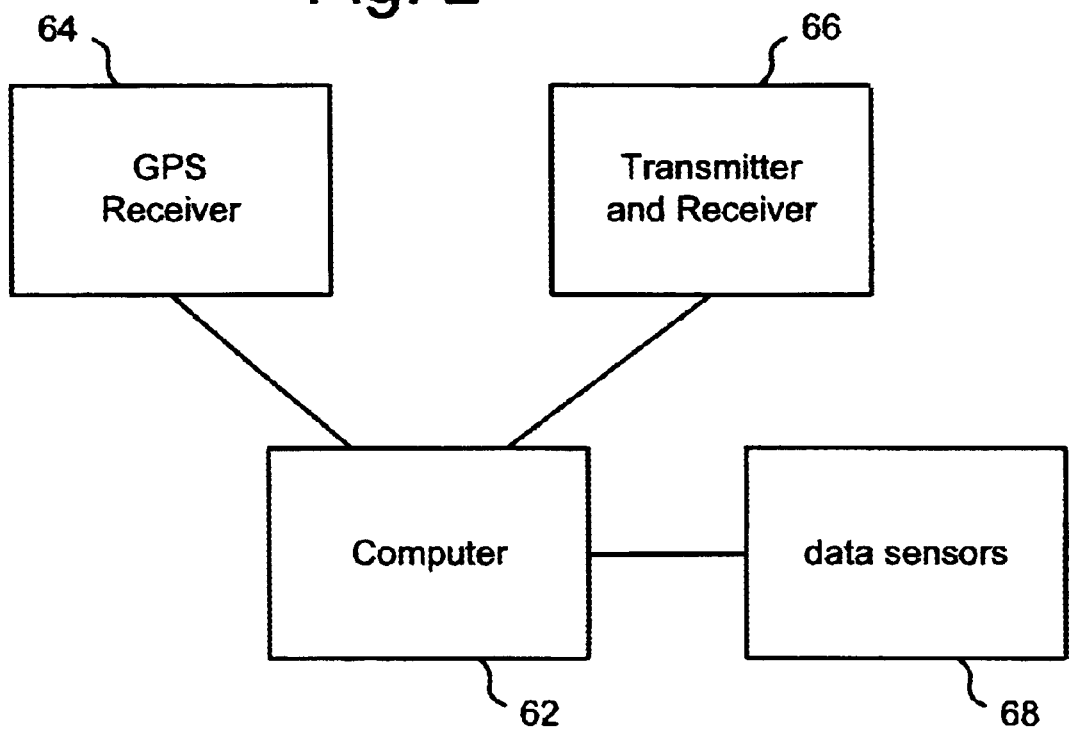
FIG. 2 is a block diagram of one embodiment of the hardware located with an object to be tracked.

FIG. 2 is a block diagram of the components typically located in automobile 20. Computer 62 is in communication with GPS receiver 64, transmitter and receiver 66 and data sensor 68. Computer 62 can be a standard computer known in the art which includes a processor, memory, one or more disk drives (hard disk and floppy disk), a CD-ROM drive, a keyboard, a pointing device, a display and I/O interfaces. In one implementation, computer 62 is mounted with materials to provide shock absorption. GPS receiver 64 is a suitable GPS receiver known in the art. One example of a suitable GPS receiver is the MiLLennium® distributed by NovAtel Inc., 112-68 Avenue NE, Calgary Alberta, Canada 2TE855, www.novatel.ca. The MiLLennium® GPS receiver is a card that fits into computer 62 and provides dual frequency GPS performance. The MiLLennium® GPS receiver outputs the three dimensional location and full wavelength carrier phase observations for both the L1 and L2 frequencies. Thus, computer 62 will either receive the three dimensional location from GPS receiver 64 or data from GPS receiver 64 indicating the information received from the satellites.

Transmitter 66 can be any means for providing communication (e.g. wireless or using a wire) from computer 62 to a central computer. One example of a suitable transmitter is an RF transmitter. Other types of transmitters can also be used. Data sensors 68 are sensors used to acquire information from the automobile (or other object being measured). For example, data sensors 68 can include an odometer sensor, a speedometer sensor, a fuel tank sensor, a tire temperature sensor, a compass, a transmission sensor, etc. Data from data sensors 68 can be used by computer 62 to determine a three dimensional location of the car. Additionally, data from sensors 68 can be transmitted to the central computer.

Figure 3:
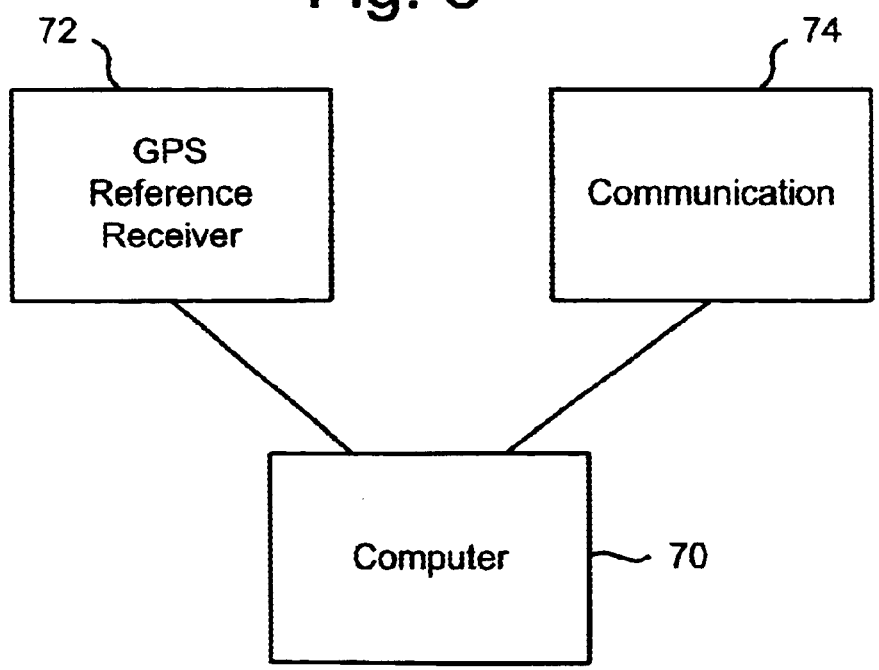
FIG. 3 is a block diagram of hardware at the site of a differential GPS reference receiver.

FIG. 3 is block diagram describing the hardware located at differential GPS reference receiver location 24. Computer 70 is in communication with GPS reference receiver 72 and communication means 74. Computer 72 is similar to computer 62. GPS reference receiver 72 is a GPS receiver known in the art that can be used in a differential GPS system. GPS receiver 72 provides reference error correction information for the other GPS receivers. Communication means 74 can include an RF transmitter for transmitting the reference error correction information from GPS reference receiver 72 to the other GPS receivers. Communication means 74 can also be used to transmit the reference error correction information to the central computer. In addition to using RF technology, communication means 74 can also send information to the central computer using the Internet, a network, a direct electrical connection, cellular technology, etc.

Figure 4:
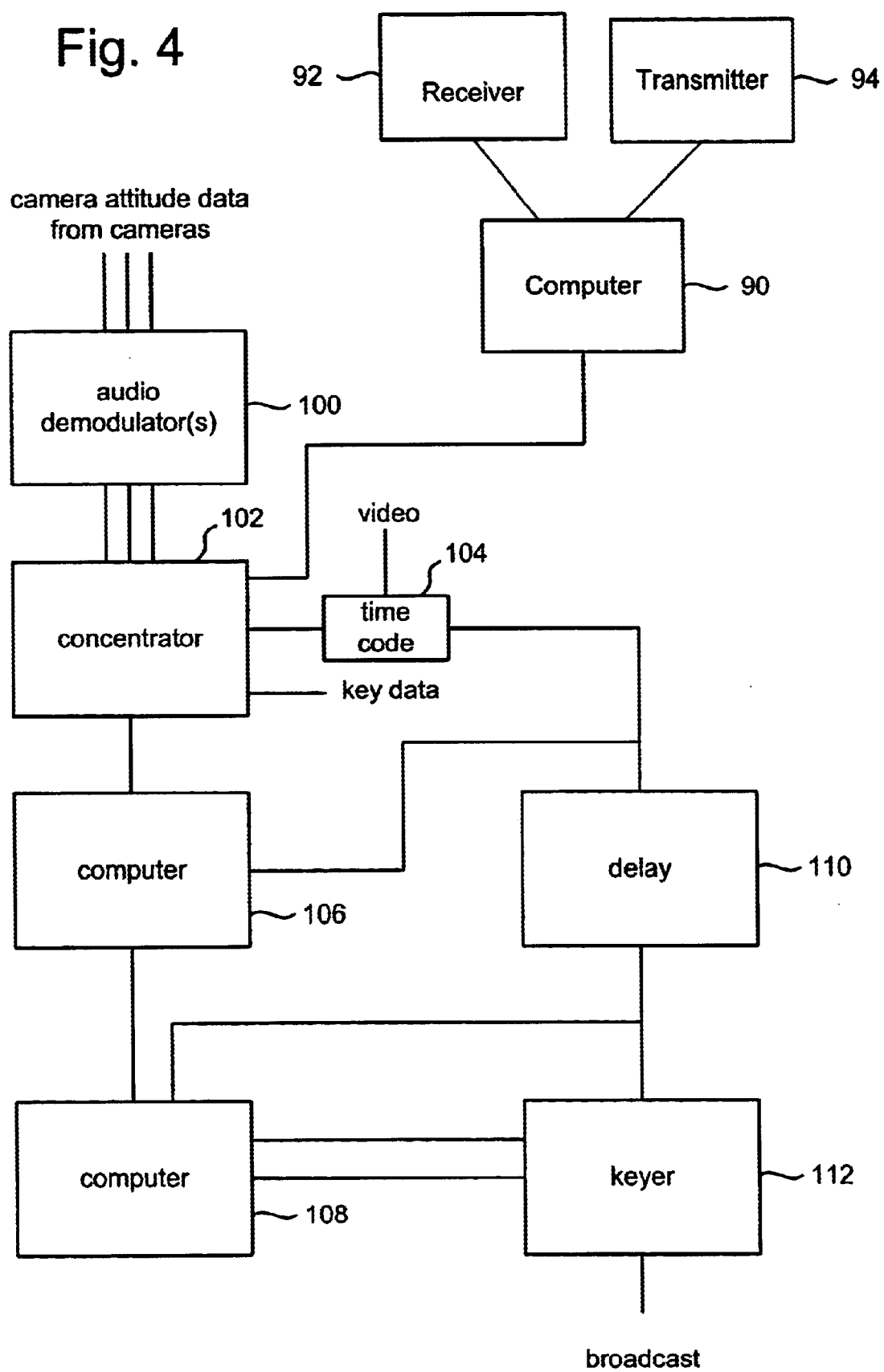
FIG. 4 is a block diagram of hardware which uses the data from the GPS receivers.

FIG. 4 is a block diagram describing hardware at central computer site 26. Central computer 90 is in communication with receiver 92 and transmitter 94. In one embodiment, receiver 92 is an RF receiver for receiving all the RF signals from the various automobiles. In one embodiment, computer 90 includes one receiver for each car. In an other embodiments, receiver 92 is one receiver that receives multiple signals on multiple channels. In yet another embodiment, a single receiver is used with one frequency band that receives data from multiple automobiles using a time slotting system. Transmitter 94 is used to transmit information back to the automobiles. For example, if computer 90 is used to determine the three dimensional location of the automobiles, then transmitter 94 will transmit the location information back to the automobiles in order to speed up a GPS receivers' cold start.

FIG. 4 also shows graphics production equipment. In one embodiment of the present invention, three dimensional locations of the various automobiles are used to determine positions in the video of the automobiles. The system can enhance the video based on the positions of the automobiles in the video. For example, one or more automobiles can be highlighted by putting a graphic over the automobile, changing the color of the automobiles, making the automobiles brighter, etc. The system can display the path of the automobiles, the previous path, the predicted path, the drafting effect, etc. Additionally, the system can similarly highlight each automobile in the video that is currently on the same lap. Thus, the viewer will know which cars are on the same lap in a race.

In one embodiment, the graphics production equipment of FIG. 4 is used in a truck located at the race. Alternatively, the equipment can be in a studio or another location. Cameras capturing video of the event will be instrumented with sensors to determine the orientation of the camera. For example, the system can use optical encoders, inclinometers, gyros and voltage from lenses in order to determine pan, tilt, zoom, focus and zoom of the camera. This data, in addition to knowing the location of the camera can be used to enhance the video. More information about camera sensors can be found in U.S. patent application Ser. No. 09/472,635, entitled MEASURING CAMERA ATTITUDE, filed Dec. 27, 1999, Stanley K. Honey, Richard H. Cavallaro, Marvin S. White, Terence J. O'Brien, Matthew T. Lazar, Stuart K. Neubarth, Alan C. Phillips and Kenneth A. Milnes, which is incorporated herein by reference.

FIG. 4 shows audio demodulator 100 which receives audio signals from one or more cameras. In one embodiment, each of the cameras having camera sensors will add the camera sensor data into the audio signal from the camera. That audio signal is sent to audio demodulator 100 which removes the camera sensor data from the audio signal. Audio demodulator 100 extracts the data from the audio signal and sends the data for each of the associated cameras to concentrator 102. Concentrator 102 receives the camera sensor data and packages the data for transmission to computer 106. In one embodiment, concentrator 102 is a computer. Concentrator 102 also receives a time code from time code generator 104. The time code is packaged with the data from the various sensors so that the data can be synchronized with the appropriate frame or field of video. In one embodiment, multiple concentrators can be used; for example, one concentrator can be used for camera sensor data and one concentrator for GPS data. In one embodiment, time code 104 is a VITC (Vertical Interval Time Code) inserter. Time code generator 104 receives the broadcast video signal and provides a time code, based on the received video, to concentrator 102.

After time code generator 104 inserts time code in the video, the video signal (with time code) is sent to computer 106 and delay 110. In one embodiment, a time code and unique camera identifier are added to the vertical blanking interval of the video from the instrumented cameras. In another embodiment, a time code is added to the sensor data at the camera location, prior to transmission to audio demodulator 100. Concentrator 102 also receives key data from another processor. The key data is used to indicate which colors in the video can be enhanced or blended with the new graphic. This allows the system to account for occlusions. More information about enhancing video can be found in U.S. patent application Ser. No. 09/160,534, filed on Sep. 24, 1998, SYSTEM FOR ENHANCING A VIDEO PRESENTATION OF A LIVE EVENT, Gloudemans et al., U.S. patent application Ser. No. 09/425,992, filed on Oct. 21, 1999, TELESTRATER SYSTEM, Meyer et al., and U.S. Provisional Patent Application Serial No. 60/180,436, filed Feb. 4, 2000, VIDEO COMPOSITOR, White et al. All three of these applications are incorporated herein by reference.

Concentrator also receives three dimensional locations of each automobile from computer 90. The three dimensional locations are packaged with the camera sensor data and sent to computer 106. Computer 106, computer 108, delay 110 and keyer 112 are used to enhance live video from a chosen camera. The present invention works with various systems for enhancing the video. Exemplar suitable systems are described in the following patent/applications: U.S. Pat. No. 5,912,700, SYSTEM FOR ENHANCING THE TELEVISION PRESENTATION OF AN OBJECT AT A SPORTING EVENT; U.S. Pat. No. 5,917,553, METHOD AND APPA- RATUS FOR ENHANCING THE BROADCAST OF A LIVE EVENT; U.S. patent application Ser. No. 09/041,238, SYSTEM FOR DETERMINING THE POSITION OF AN OBJECT, filed on Mar. 11, 1998, U.S. patent application Ser. No. 09/160,534, SYSTEM FOR ENHANCING A VIDEO PRESENTATION OF A LIVE EVENT, filed on Sep. 24, 1998, all of which are incorporated herein by reference.

Computer 106 receives the sensor data, key data, automobile locations and time codes from concentrator 102. Computer 106 also receives a video signal, including VITC. Using the data from the camera sensors, computer 106 converts the three dimensional locations to two dimensional positions in a frame or field of video from the chosen or tallied camera. The two dimensional positions are sent to computer 108 to draw (or set up) a field or frame of video with a graphic. Computer 108 then sends a graphic and a key to a keyer to combine the graphic with the video from the camera. Rather than using a standard keyer known in the art, the system can also use a compositor described in Provisional Patent Application No. 60/180,436, VIDEO COMPOSITOR, White et al, filed Feb. 4, 2000, which is incorporated herein by reference.

The video for broadcast is sent from time code 104 to a delay 110 in order to delay the video a number frames to allow for the processing of the camera sensor information and other methods described herein. After being delayed, the video sent from delay 110 to keyer 112 for combining with the graphics generated by computer 108. The output of keyer 112 can be sent for broadcast or recorded for future use. In the embodiment described above, the components operate in real time and enhance live video. In another embodiment, the camera attitude information can be used to enhance pre-stored video.

In one embodiment, a third computer can be used to provide a user interface which, among other things, allows an operator to choose which colors can be replaced with a graphic. This third computer supplies the key data to concentrator 102. In this embodiment, computer 106 determines where within a given field or frame a graphic should be inserted, and computer 108 draws a graphic and synchronizes the graphic with the appropriate field or frame.

Figure 5:
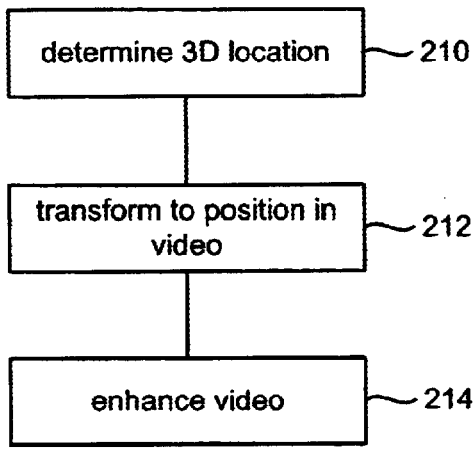
FIG. 5 is a flow chart describing the method for enhancing video using the present invention.

FIG. 5 is a flow chart describing the process of enhancing video using the present invention. In step 210, the system determines a three dimensional location of the objects of interest. In one embodiment, step 210 is performed by the equipment at each of the automobiles. In another embodiment, each of the cars sends raw data to central computer 90, and central computer 90 determines the three dimensional locations of each of the automobiles. In step 212, the three dimensional locations determined in step 210 are transformed into two dimensional positions in the video. The step can be performed using any method known in the art. One example described in the documents incorporated by reference is to use transformation matrices. In addition, the system can determine orientation based on a model of the track, previous laps or a succession of position samples. In step 214, the video is enhanced as described above.

Figure 6:
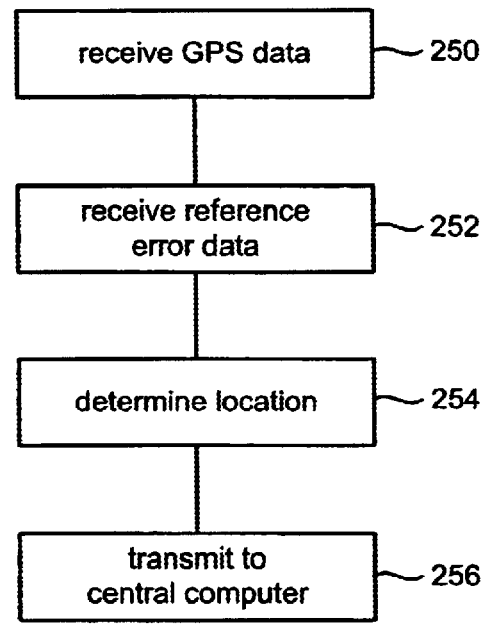
FIG. 6 is flow chart of the operation of the hardware of FIG. 2.

FIG. 6 provides a flow chart describing the method of operation of the hardware of FIG. 2. In step 250, GPS receiver 64 receives GPS information from a number of GPS satellites. In step 252, computer 62 receives reference error signals from the GPS reference receiver 72. In an embodiment that is not using differential GPS, step 252 would not be performed. In step 254, the system determines the location of GPS receiver 64. In step 256, the determined location is transmitted to central computer 90.

Figure 7:
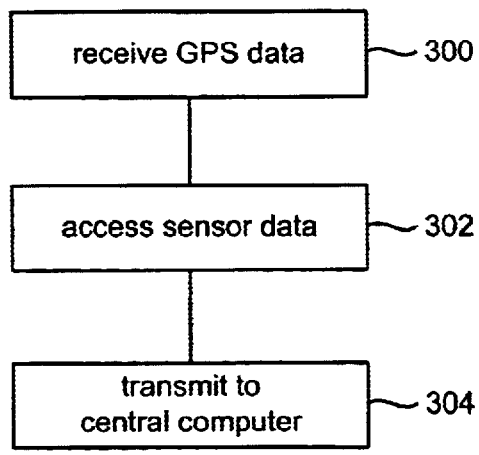
FIG. 7 is a flow chart describing the operation of an alternative embodiment of the present invention.

FIG. 7 is an alternative embodiment. In step 300 GPS receiver 64 receives GPS data, similar to step 250. In step 302, computer 62 accesses data from sensors 68. In step 304, the data from sensor 68 and the GPS information based on the data received in step 300 are transmitted to central computer 90. One embodiment of the method of FIG. 7 also includes determining the location of GPS receiver 64 using the GPS information (optionally including differential GPS information) and the data from the sensors.

Figure 8:
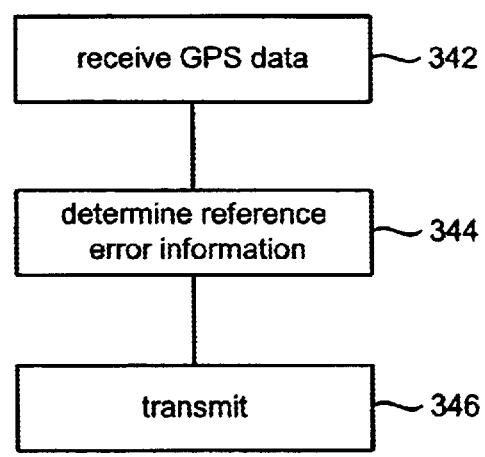
FIG. 8 is a flow chart describing the method of operation of the hardware in FIG. 3.

FIG. 8 provides a flow chart describing the operation of the hardware of FIG. 3. In step 342 GPS reference receiver 72 receives GPS data. In step 344, GPS reference receiver 32 calculates the reference error information to be transmitted to the GPS receivers. In one embodiment, step 344 can be performed by computer 70. In step 346, the calculated reference error signal is transmitted by communication means 74 to the other GPS receivers.

Figure 9:
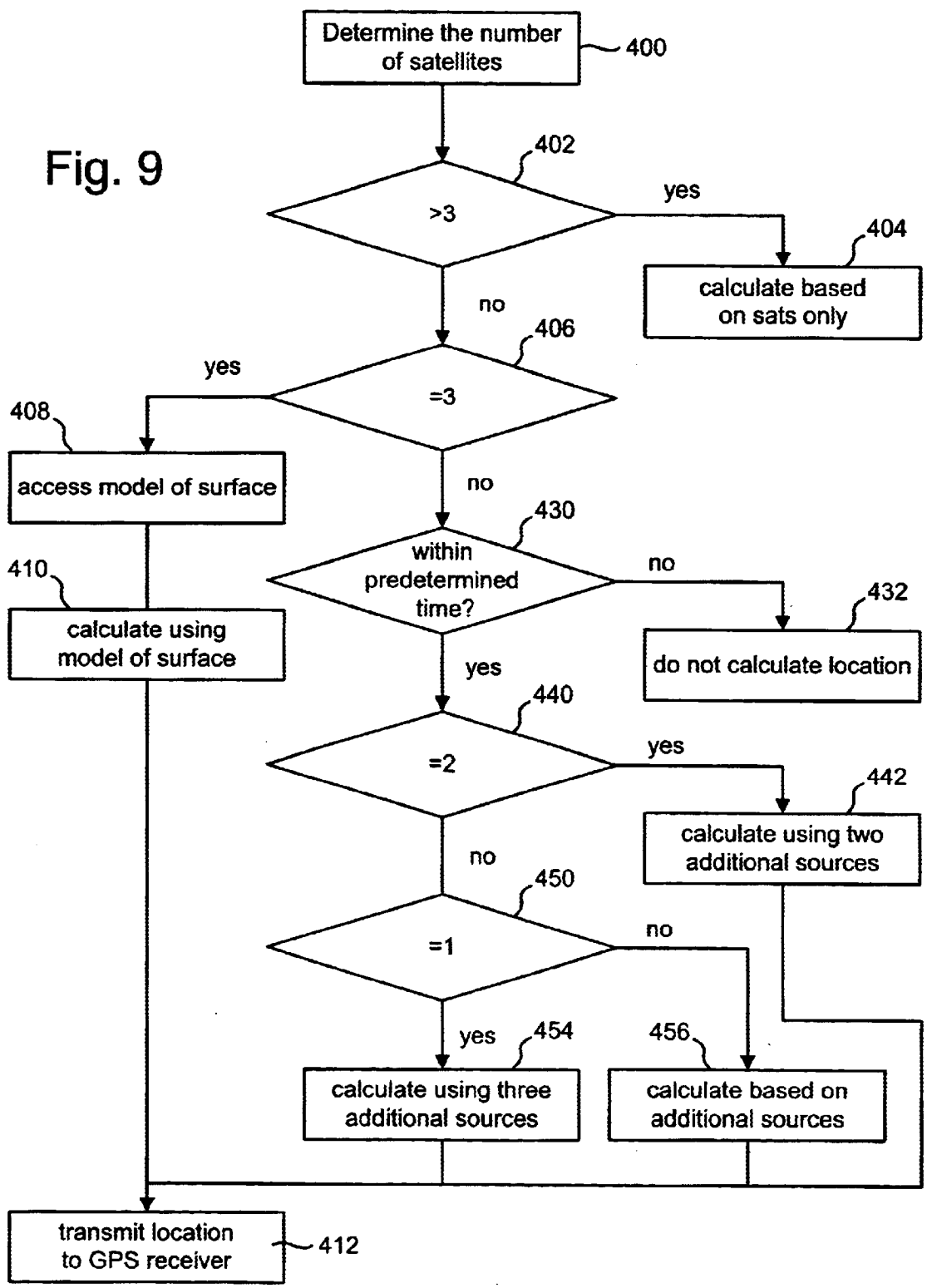
FIG. 9 is a flow chart describing one exemplar method for determining a location according to the present invention.

FIG. 9 provides a flow chart describing the details of how the system determines the three dimensional location of an object (e.g. an automobile) using the present invention. For example, FIG. 9 provides one embodiment of step 254 of FIG. 6. In step 400, the system determines the number of satellites for which GPS receiver 64 received valid data. If the number of satellites determined in step 400 is greater than 3 (step 402), then the system calculates the location based on the satellite information only (step 404). In one embodiment, step 404 is performed by GPS receiver 64. In another embodiment, step 404 can be performed by computer 62. If the number of satellites determined in step 404 is not greater than 3 (step 402), then the system determines whether the number of satellites determined in step 400 is equal to exactly 3 satellites (step 406). If the number of satellites for which valid data is received was equal to 3, then in step 408 the system accesses a representation or model of the surface that the object is traveling on in step 408. In step 410, the system uses the representation or model of the surface in combination with the GPS data to determine the location of the object. Steps 408 and 410 are performed by computer 62. After calculating the three dimensional location of the object, then, in step 412, the calculated three dimensional location is transmitted back to GPS receiver 64 to speed up the cold start process.

The representation or model of the surface is a three dimensional model of the surface that the object is traveling on. For example, if the invention is used to track cars in a race, then the surface is the race track. The model or representation of the race track includes three dimensional coordinates or means for determining three dimensional coordinates describing the surface of the race track. The representation or model could include a set of equations for determining the three dimensional positions of each part of the race track. It is likely, that not every coordinate for the entire race track would be stored. Rather, the system can store a subset of data and interpolate.

Figure 10:
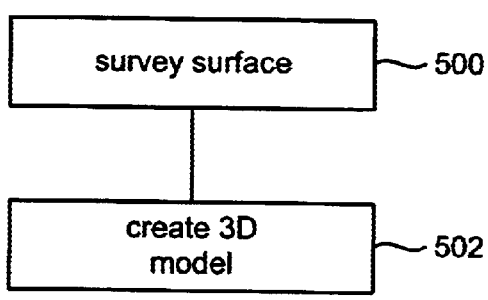
FIG. 10 is a flow chart describing a method for modeling a surface.

FIG. 10 provides a flow chart for creating the model of the surface. In step 500, the surface that the object will be traveling on is surveyed. This could include using surveying equipment to determine the three dimensional location of various positions of a race track. In step 502, the model is created by storing the data in a logical form or creating a set of equations to model the track. Based on the stored model of the track, any position on the track can be easily be converted to a three dimensional location in real space. The track is likely to have different elevations, banked turns, etc. Thus, one implementation of the model of the race track describes a two dimensional ribbon in three dimensional space.

Looking back to FIG. 9, if the number of satellites is not determined to be equal to three in step 406, then in step 430, the system determines whether there has been a predetermined time interval elapsed since the system had four satellites providing valid data. If the system is not within that predetermined time interval, then in step 432, no location calculation is performed. If the system is within the time interval, then in step 440, it is determined whether there is valid data from two satellites. If there is valid data from two satellites then, in step 442, the system calculates the object's location using two additional sources and the GPS data received from the two satellites. In one embodiment, one of the two additional sources is a quartz oscillator. Since the quartz oscillator is only valid for 5 to 10 seconds, the elapsed time tested in step 430 would be 5 to 10 seconds depending on the accuracy of the oscillator. In one embodiment of step 442, the two additional sources are the quartz oscillator and the representation of the surface. Other additional sources could also be used. After determining the location in step 442, the method loops to step 412 and transmits that location back to GPS receiver 64.

If in step 440 it is determined that the number of satellites providing valid data to GPS receiver 64 is not equal to two, the method loops to step 450. In step 450, the system tests whether the number of satellites providing valid data is equal to one. If there is one satellite providing valid data to GPS receiver 64, the system loops to step 454 and calculates the location based on the received valid GPS data and three additional sources. Subsequent to step 454, the method loops to step 412 and the determined location is transmitted back to GPS receiver 64.

If, in step 450, it is determined that there are no satellites providing valid data, then in step 456, the system calculates the location of the object based on additional sources and no GPS data. Subsequent to step 456, the method loops to step 412.

Figure 11:
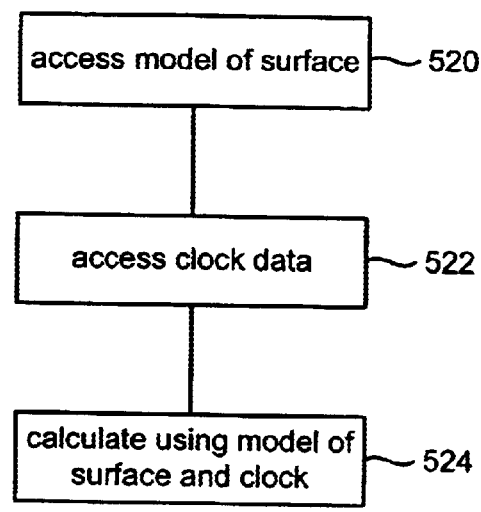
FIG. 11 is a flow chart describing one exemplar method of determining a location when the GPS receiver is only receiving valid data from two GPS satellites (or pseudolites).

FIG. 11 is a flow chart describing the method of step 442, calculating location based on two additional sources and GPS data. In step 520, the system accesses the model of the surface of travel for the object. In step 522, the system accesses the clock data from the quartz oscillator. In step 524, the system calculates the location of the object using the model of the surface, the clock data and GPS data.

Figure 12:
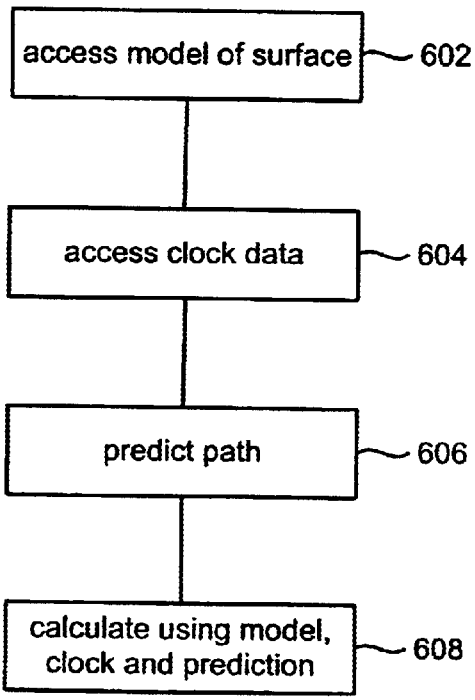
FIG. 12 is a flow chart describing one exemplar method for determining a location when a GPS receiver is only receiving valid data from one satellite (or pseudolite).

FIG. 12 is a flow chart describing the method of step 454, calculating the location using three additional sources with GPS data. In step 602, the system accesses the model of the surface of travel of the object. In step 604, the system accesses the clock data from the quartz oscillator. In step 606, the system predicts the path of the object based on previous locations and the model of the surface. That is if the car is on a particular curve, that curve can be extended; if the car is driving straight, that straight path can be extended, etc. Using the velocity of the object based on previous location and timing information, and the clock data from 604, a position on the future path can be predicted. In one embodiment, the system can read the automobile's odometer (including an inertial sensor) to determine where on the track the automobile is. This predicted new position in conjunction with the model of the surface, the clock data and the GPS data can be used to calculate the location in step 608.

Figure 13:
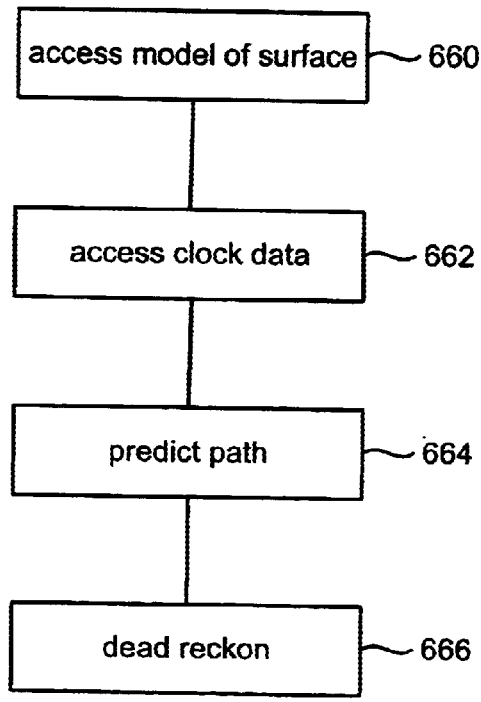
FIG. 13 is a flow chart describing a method for determining a location when a GPS receiver is temporarily not receiving data from any GPS satellites.

FIG. 13 provides a flow chart for describing the method of step 456, calculating a location based on additional sources without any current GPS data. In step 660, the system access the model of the surface. In step 662, the system accesses the clock data from the quartz oscillator. In step 664, the system predicts the path similar to step 606. In step 666, the system uses dead reckoning to determine the new location based on step 660, 662, 664 and (optionally) other appropriate data from data sensors 68. More information on dead reckoning can be found in U.S. Pat. No. 4,796,191, VEHICLE NAVIGATION SYSTEM AND METHOD, Honey et al., incorporated herein by reference.

Another example of additional data that can be used when other data is missing is to use path information for other cars. If there are multiple cars being tracked over time, the system may have determined locations at a given time for some cars but not the others. The system can infer the location of the cars having missing data.

In another embodiment, any satellite can be replaced with a pseudolite. In yet another embodiment, data from the GPS receiver and data from the additional sources can be used with a Kalman filter (or other least squares adaptive filter) to determine a more accurate three dimensional location.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of tracking a moving object using GPS, comprising the steps of:

receiving GPS data;

receiving information about said object from a data sensor associated with said object, wherein said information is not GPS data;

accessing a representation of a surface, said object traveling on said surface; and using at least said representation of said surface and said information about said object with GPS data from no more than three useful satellites to determine a location of said object.

2. A method according to claim 1, wherein:

said representation of said surface is a three dimensional representation of said surface.

3. A method according to claim 1, wherein:

said representation of said surface is a two dimensional ribbon in three dimensional space.

4. A method according to claim 1, wherein:

said object is an automobile; and said surface is a road.

5. A method according to claim 1, further including the step of:

creating said representation of said surface.

6. A method according to claim 1, wherein:

said GPS data is received from a satellite.

7. A method according to claim 1, wherein:

at least a subset of said GPS data is from a pseudolite.

8. A method according to claim 1, further including the step of:

receiving an error signal from a reference receiver, said step of using also uses said error signal to determine said location of said object.

9. A method according to claim 1, further including the step of:

transmitting information based on said GPS data to a processor location, said processor location is different than said location of said object, said steps of using said representation and receiving an error signal are performed at said processor location.

10. A method according to claim 1, further including the step of:

receiving timing information from a high quality clock device, said step of using also uses said timing information for a short period of time if GPS data is only accurately available for two useful satellites.

11. A method according to claim 10, wherein:

said high quality clock device is a quartz oscillator.

12. A method according to claim 10, wherein said information about said object is odometer information, and said step of using uses said odometer information if GPS data is only accurately available for one useful satellite.

13. A method according to claim 12, further including the step of:

predicting a path of said object, said step of using also uses said path if GPS data is not accurately available.

14. A method according to claim 1, further including the step of:

predicting a path of said object, said step of using also uses said path if GPS data is only accurately available for two useful satellites.

15. A method according to claim 1, wherein said information about said object is odometer information, and said step of using uses said odometer information if GPS data is only accurately available for two useful satellites.

16. A method according to claim 1, further including the step of:

communicating said determined location to a GPS receiver, said received GPS data is received from said GPS receiver, said GPS receiver uses said location to lock in a fix.

17. A method according to claim 1, further including the steps of:

receiving video of said object;

converting said location of said object to a position in said video; and adding an image to said video based on said position.

18. A method of tracking a moving object using GPS, comprising the steps of:

receiving GPS data; and determining a location of said object based on said GPS data, first additional data if said GPS data only includes valid data from no more than three GPS sources, second additional data if said GPS data only includes valid data from no more than two useful GPS sources, and third additional data if said GPS data only includes valid data from no more than one useful GPS source.

19. A method according to claim 18, wherein:

said first additional data is based on a representation of a surface, said object travels on said surface;

said second additional data is from a timing device; and said third additional data is from an odometer.

20. A method according to claim 18, wherein:

said step of determining includes using fourth additional data if said GPS data does not include valid data.

21. A method according to claim 20, wherein:

said first additional data is from a representation of a surface, said object traveling on said surface;

said second additional data is from a timing device;

said third additional data is from an odometer; and said fourth additional data is based on a prediction of a path of said object.

22. A method of tracking a moving object using GPS, comprising the steps of:

receiving GPS data from a GPS receiver;

receiving error correction data from at least one non-GPS source, wherein said at least one non-GPS source includes a data sensor associated with said object, wherein said data sensor acquires at least a portion of said error correction data from said object;

determining a location of said object based on said GPS data and said error correction data; and communicating said location to said GPS receiver.

23. A method according to claim 22 wherein:

said GPS data is based on valid information received by said GPS receiver from no more than three useful GPS sources.

24. A method according to claim 22, further including the step of:

using said location to fix on said location using new valid information from GPS sources.

25. A method according to claim 22, wherein:

said error correction data includes three dimensional information about a surface, said object traveling on said surface.

26. A method according to claim 25, wherein:

said error correction data includes timing information.

27. A method according to claim 22, wherein:

said error correction data includes timing information.

28. One or more processor readable storage devices having processor readable code embodied on said processor readable storage devices, said processor readable code for programming one or more processors to perform a method comprising the steps of:

receiving GPS data; and determining a location of said object based on said GPS data, first additional data if said GPS data only includes valid data from no more than three GPS sources, second additional data if said GPS data only includes valid data from no more than two useful GPS sources, and third additional data if said GPS data only includes valid data from no more than one useful GPS source.

29. One or more processor readable storage devices according to claim 28, wherein:

said first additional data is based on a representation of a surface, said object travels on said surface;

said second additional data is from a timing device; and said third additional data is from an odometer.

30. One or more processor readable storage devices according to claim 28, wherein:

said step of determining includes using fourth additional data if said GPS data does not include valid data;

said first additional data is from a representation of a surface, said object traveling on said surface;

said second additional data is from a timing device;

said third additional data is from an odometer; and said fourth additional data is based on a prediction of a path of said object.

31. One or more processor readable storage devices according to claim 28, wherein:

said step of determining uses information based on a prediction of a path of said object.

32. One or more processor readable storage devices according to claim 28, wherein:
said first additional data, said second additional data and said third additional data includes data from one or more of a representation of a surface, a timing device and an odometer, said object travels on said surface.

33. An apparatus for tracking moving objects, comprising:
a GPS receiver; and
a processing unit, said processing unit performs a method comprising the steps of:
receiving GPS data from said GPS receiver, and
determining a location of said object based on said GPS data, first additional data if said GPS data only includes valid data from no more than three GPS sources, second additional data if said GPS data only includes valid data from no more than two useful GPS sources, and third additional data if said GPS data only includes valid data from no more than one useful GPS source.

34. An apparatus according to claim 33, wherein:
said step of determining uses information based on a prediction of a path of said object.

35. An apparatus according to claim 33, wherein:
said first additional data, said second additional data and said third additional data includes data from one or more of a representation of a surface, a timing device and an odometer, said object travels on said surface.

36. An apparatus according to claim 33, wherein:
said first additional data is based on a representation of a surface, said object travels on said surface;
said second additional data is from a timing device; and
said third additional data is from an odometer.

37. An apparatus according to claim 36, wherein:
said step of determining includes using fourth additional data if said GPS data does not include valid data;
said first additional data is from a representation of a surface, said object traveling on said surface;
said second additional data is from a timing device;
said third additional data is from an odometer; and
said fourth additional data is based on a prediction of a path of said object.

38. A method according to claim 18, wherein:
said first additional data is based on a said representation of a surface, said object travels on said surface, said representation of said surface is a three dimensional representation of said surface.

39. A method according to claim 18, wherein:
said first additional data is based on a said representation of a surface, said object travels on said surface, said representation of said surface is a two dimensional ribbon in three dimensional space.

40. A method according to claim 18, wherein:
said step of determining uses information based on a prediction of a path of said object.

41. A method according to claim 18, wherein:
said first additional data, said second additional data and said third additional data includes data from one or more of a representation of a surface, a timing device and an odometer, said object travels on said surface.

42. A method according to claim 1, wherein said information about said object is odometer information.

43. A method according to claim 1, wherein said data sensor is mounted on said object.

44. A method according to claim 1, wherein said step of using is performed with GPS data from no more than one useful satellite.

45. A method according to claim 22, wherein:
said GPS data is based on valid information received by said GPS receiver from no more than one useful GPS source.

46. A method according to claim 22, wherein said information about said object is odometer information.

* * * * *